(12) United States Patent
Gillespie et al.

(10) Patent No.: US 8,176,352 B2
(45) Date of Patent: May 8, 2012

(54) CLOCK DOMAIN DATA TRANSFER DEVICE AND METHODS THEREOF

(75) Inventors: Kevin Gillespie, Pembroke, MA (US); Guhan Krishnan, Chelmsford, MA (US); Maurice Steinman, Mailborough, MA (US); Spencer Gold, Pepperell, MA (US); Bill K. C. Kwan, Austin, TX (US)

(73) Assignee: Adavanced Micro Devices, Inc., Sunnyvale, CA (US)

( * ) Notice: Subject to any disclaimer, the term of this patent is extended or adjusted under 35 U.S.C. 154(b) by 1057 days.

(21) Appl. No.: 12/104,246

(22) Filed: Apr. 16, 2008

(65) Prior Publication Data

US 2009/0261869 A1    Oct. 22, 2009

(51) Int. Cl.
 *G06F 1/04* (2006.01)
(52) U.S. Cl. ........ 713/600; 713/400; 713/501; 327/145; 327/156; 711/163

(58) Field of Classification Search .................. 713/400, 713/501, 600; 327/145, 156; 711/163
See application file for complete search history.

(56) References Cited

U.S. PATENT DOCUMENTS

| | | | |
|---|---|---|---|
| 6,904,537 B1 * | 6/2005 | Gorman | 713/401 |
| 7,007,186 B1 * | 2/2006 | Li et al. | 713/400 |
| 7,219,251 B2 * | 5/2007 | Adkisson | 713/400 |
| 7,436,917 B2 * | 10/2008 | Adkisson et al. | 375/354 |
| 7,451,338 B2 * | 11/2008 | Lemos | 713/400 |
| 7,500,044 B2 * | 3/2009 | Wang et al. | 710/310 |

* cited by examiner

*Primary Examiner* — Thuan Du

(57) ABSTRACT

Two clock domains of a data processing device are each synchronized with a different clock signal. The clock signals are generated by clock generation logic. The clock generation logic also generates a transfer enable signal based on the relative frequency of each clock signal to indicate when data can be transferred between the clock domains. Further, as the relative frequency of the clock signals change, the timing of the transfer enable signal also changes to ensure reliable data transfer.

13 Claims, 8 Drawing Sheets

CLOCK DOMAIN DATA TRANSFER DEVICE AND METHODS THEREOF

FIELD OF THE DISCLOSURE

The present disclosure relates to data processing devices, and more particularly to transfer of data between two clock domains of a data processing device.

BACKGROUND

Data processing devices sometimes include more than one clock domain, whereby different clock signals are applied to each clock domain, and the logic elements in each clock domain are synchronized to the clock applied to that domain. Transfer of data between two clock domains can be problematic when the clock signals associated with the clock domains have an uncertain frequency or phase relationship. Synchronizer logic can be interposed between the clock domains to facilitate data transfer, but can render the timing of data transfer indeterminate, thereby increasing the difficulty in testing the data processing device. Moreover, the synchronizer logic can consume an undesirable amount of die area, and also increase latency in the data transfer, reducing performance of the data processing device. Accordingly, an improved method and device for transferring data between clock domains would be useful.

DETAILED DESCRIPTION

Two clock domains of a data processing device are each synchronized with a different clock signal. The clock signals are generated by clock generation logic. The clock generation logic also generates a transfer enable signal based on the relative frequency of each clock signal to indicate when data can be transferred between the clock domains. Further, as the relative frequency of the clock signals change, the timing of the transfer enable signal also changes to ensure reliable data transfer.

Figure 1:
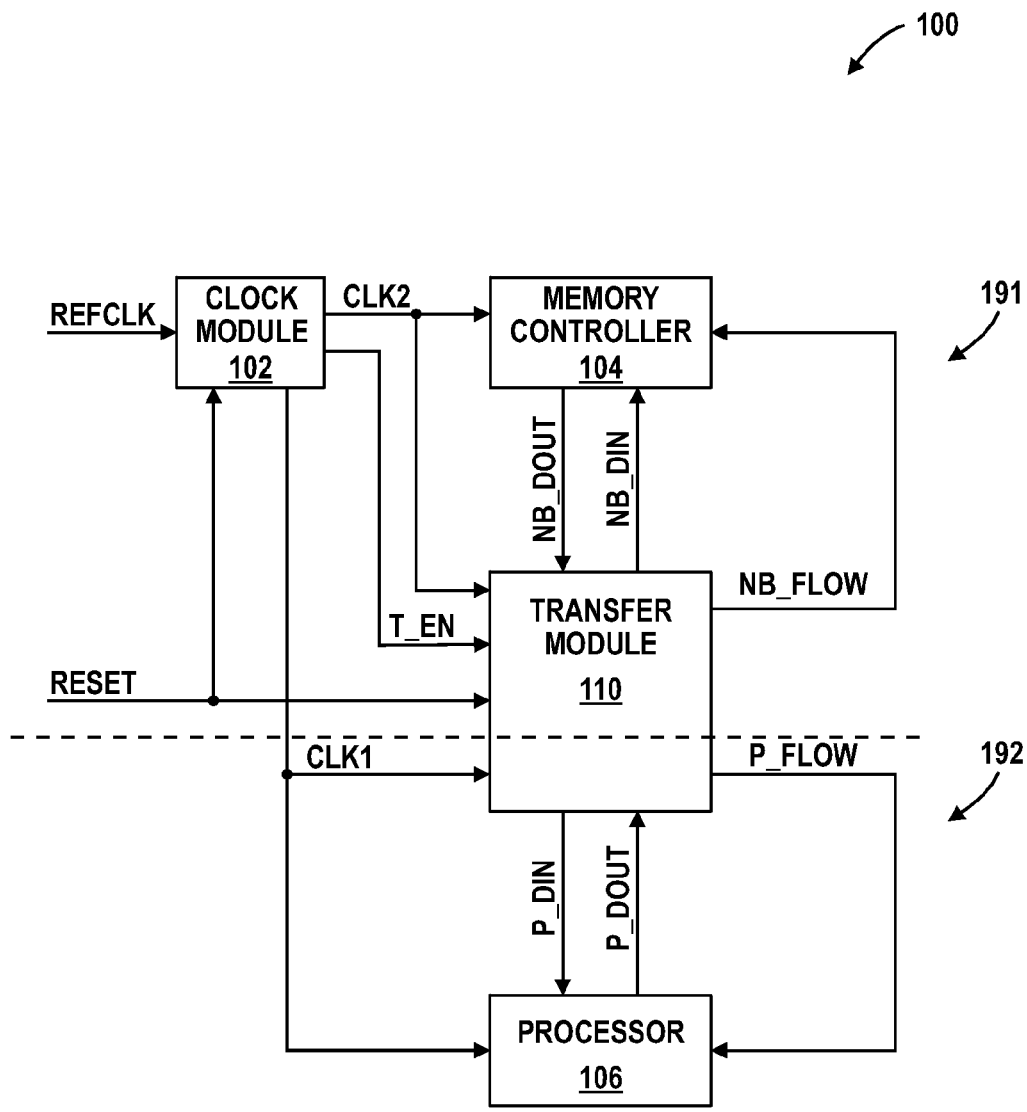
FIG. 1 is a block diagram of a data processing device in accordance with one embodiment of the present disclosure.

FIG. 1 illustrates a data processing device 100 in accordance with one aspect of the present disclosure. The data processing device 100 includes a clock module 102, a memory controller 104, a processor 106, and a transfer module 110.

The clock module 102 includes an input to receive a reference clock signal, labeled "REFCLK", an output to provide a clock signal labeled "CLK1", an output to provide a clock signal labeled "CLK2" and an output to provide a transfer enable signal labeled "T_EN." The memory controller 104 includes an input to receive the clock signal CLK2, an input to receive a data signal labeled "NB_DIN", an input to receive a control signal labeled "NB_FLOW" and an output to provide a data signal labeled "NB_DOUT." The processor 106 includes an input to receive the clock signal CLK1, an input to receive a data signal labeled "P_DIN", an input to receive a control signal labeled "P_FLOW", and an output to provide a data signal labeled "P_DOUT." The transfer module 110 includes an input to receive the clock signal CLK1, an input to receive the clock signal CLK2, an input to receive the data signal NB_DOUT, an input to receive the data signal P_DOUT, an input to receive a reset signal labeled "RESET", an input to receive the transfer enable signal T_EN, an output to provide the data signal NB_DIN, and an output to provide the data signal P_DIN.

The data processing device 100 is configured to operate in two clock domains, illustrated in FIG. 1 as clock domains 191 and 192. As used herein, the term "clock domain" refers to logic elements that a synchronized to a common clock signal. In the illustrated example of FIG. 1, clock domain 191 includes logic elements synchronized to the clock signal CLK1, while clock domain 192 includes logic elements synchronized to the clock signal CLK2.

The clock module 102 is configured to provide the clock signals CLK1 and CLK2 to the clock domains 191 and 192, respectively, based on the reference clock signal REFCLK. In one embodiment, the reference clock signal REFCLK is generated internally at the data processing device 100 by an oscillator or other module (not shown). In another embodiment, the data processing device 100 receives the REFCLK signal from an external source via an input/output pin (not shown).

In the illustrated example of FIG. 1, the clock module 102 can provide the CLK1 and CLK2 clock signals at different frequencies. The frequency of each clock signal can be based on values stored in one or more internal registers of the clock module 102. Accordingly, the frequency of each of the CLK1 and CLK2 clock signals can be changed by writing a value to the internal registers. In one embodiment, a power control module (not shown) of the data processing device 100 dynamically changes the frequency of one or both of the CLK1 and CLK2 clock signals to manage power consumption of the device. For example, if the data processing device 100 enters a low-power mode, the power control module can reduce the frequency of one or both of the CLK1 and CLK2 clock signals relative to their frequencies in a normal mode of operation in order to conserve power. To illustrate, in one mode the frequency of the CLK1 signal is twice the frequency of the second clock signal in one mode of operation, and in another mode of operation is three times the frequency of the second clock.

Based on the relative frequency of the clock signals CLK1 and CLK2, the clock module 102 provides the transfer enable signal T_EN. In particular, the clock module 102 controls the timing of assertions of the T_EN signal so that the signal indicates when data should be transferred between clock domains 191 and 192. The T_EN signal ensures that data transfers only take place when data to be transferred is stable in the source (i.e. the transferring) clock domain.

The memory controller 104 is a synchronous logic module configured to process communications between different modules of the data processing device 100, including control of transfers to and from device memory (not shown). As used herein, a synchronous logic module refers to a module including one or more synchronous elements that are synchronized to a common clock. In an embodiment, the memory controller 104 is a "northbridge" memory controller that controls communications to and from memory and input/output controllers (e.g. a southbridge). As part of its functions, the memory controller 104 transfers data to and from the clock domain 192. In particular, the memory controller 104 receives data from the clock domain 192 via the NB_DIN signal and provides data to the clock domain 192 via the NB_DOUT signal. Further, the memory controller 104 manages data transfer based on the NB_FLOW signal, which indicates whether data can be reliably provided via the NB_DOUT signal.

The processor 106 is a synchronous logic module that can be a general purpose processor, an application specific integrated circuit (ASIC), and the like. In one embodiment, the processor 106 includes a processor core that executes specified functions of the data processing device 100. In order to execute the designated functions, the processor 106 transfers data to the clock domain 191 via the P_DOUT signal, and receives data from the clock domain 191 via the P_DIN signal. The processor 106 bases the timing of transfers to the clock domain 191 on the P_FLOW signal, which indicates when data can be provided to a FIFO buffer in the transfer module 110.

The transfer module 110 is configured to transfer data between the clock domains 191 and 192. Accordingly, the transfer module 110 receives data via the signal NB_DOUT, which is synchronized to the clock signal CLK2, and provides the received data via the signal P_DIN, which is synchronized to the clock signal CLK1. Similarly, the transfer module 110 receives data via the signal P_DOUT, which is synchronized to the clock signal CLK1, and provides the received data via the signal NB_DIN, which is synchronized to the clock signal CLK2. The timing of data transfers between clock domains is based upon the timing of the received transfer enable signal T_EN to ensure that the data is stable in the source domain before it is provided to the target domain.

In addition, the transfer enable module 110 provides the flow control signals NB_FLOW and P_FLOW to control when data is provided from the memory controller 104 and the processor 106, respectively, to the transfer module 110. This ensures that FIFOs at the transfer enable module do not overflow, which could result in a loss of data.

Figure 2:
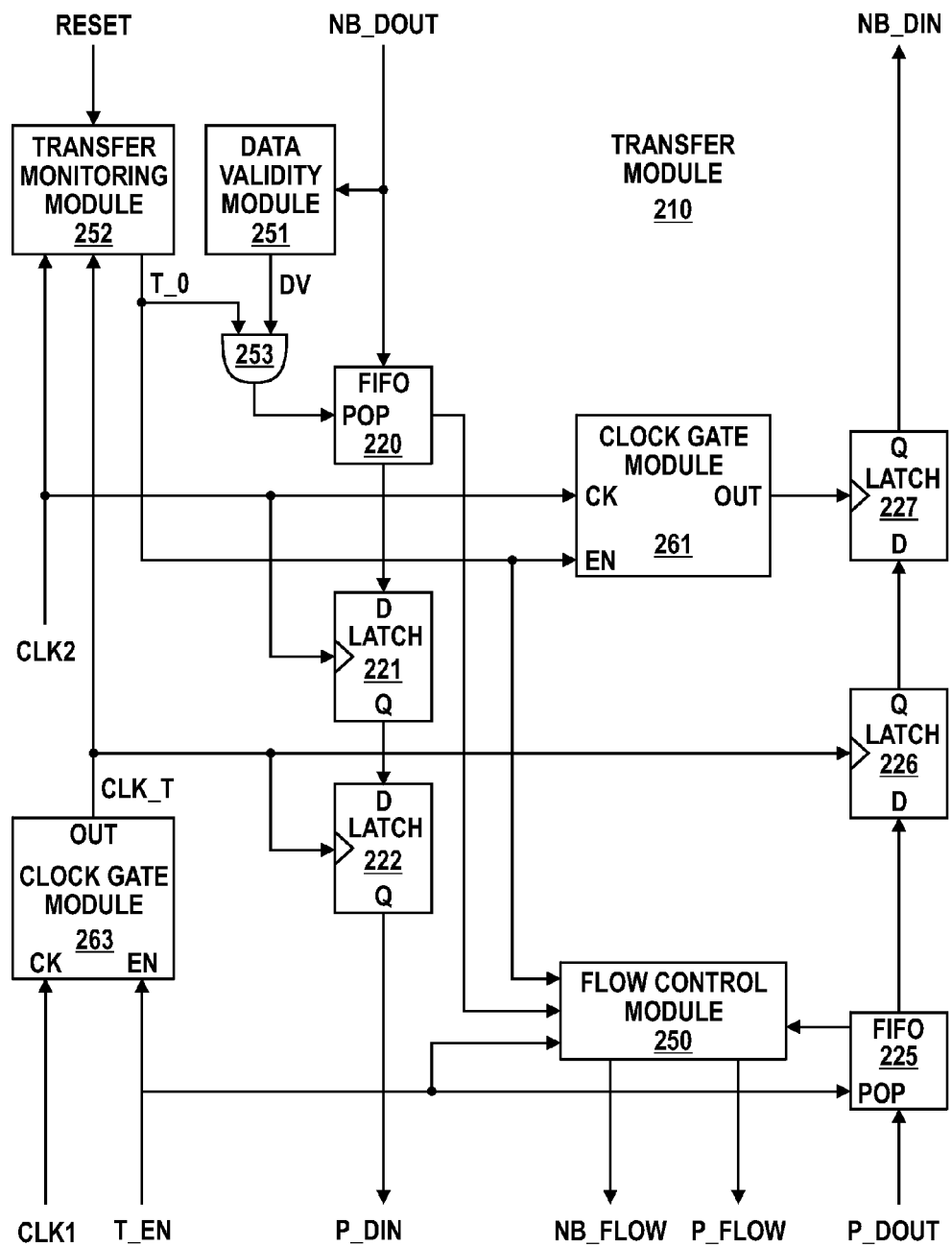
FIG. 2 is a block diagram of a particular embodiment of a transfer module of FIG. 1.

FIG. 2 illustrates a block diagram of a particular embodiment of a transfer enable module 210, corresponding to the transfer enable module 110 of FIG. 1. The transfer enable module includes FIFOs 220 and 225, latches 221, 222, 226, and 227, clock gate modules 261 and 263, a flow control module 250, a data validity module 251, a transfer monitoring module 252, and an AND gate 253. The clock gate module 263 includes an input, labeled "CK" to receive the clock signal CLK1, an input labeled "EN" to receive the transfer enable signal T_EN, and an output labeled "OUT" to provide a clock signal labeled CLK_T. The data validity module 251 includes an input to receive the data signal NB_DOUT and an output to provide a signal labeled "DV."

The transfer monitoring module 252 includes an input to receive the RESET signal, an input to receive the CLK_T signal, an input to receive the CLK2 clock signal, and an output to provide a signal labeled T_O. The AND gate 251 includes an input to receive the DV signal, an input to receive the T_O signal, and an output. The clock gate module 261 includes an input, labeled "CK" to receive the clock signal CLK2, an input labeled "EN" to receive the transfer enable signal T_O, and an output labeled "OUT."

The FIFO 220 includes an input labeled "POP" connected to the output of the AND gate 253, an input to receive the NB_DOUT signal, a first output, and a second output. The latch 221 includes an input labeled "D" connected to the first output of the FIFO 220, a clock input to receive the signal CLK2, and an output labeled "Q." The latch 222 includes an input labeled "D" connected to the output of the latch 221, a clock input to receive the signal CLK_T, and an output labeled "Q" to provide the signal P_DIN.

The FIFO 225 includes an input to receive the signal P_DOUT, an input labeled "POP" to receive the transfer enable signal T_EN, a first output, and a second output. The latch 226 includes an input labeled "D" connected to the first output of the FIFO 225, a clock input to receive the signal CLK_T, and an output labeled "Q." The latch 227 includes an input labeled "D" connected to the output of the latch 226, a clock input connected to the output of the clock gate module 261, and an output labeled "Q" to provide the signal NB_DIN.

The flow control module includes an input connected to the second output of the FIFO 220, an input connected to the second output of the FIFO 225, an input to receive the signal T_O, an input to receive the signal T_EN, an output to provide the signal NB_FLOW, and an output to provide the signal P_FLOW.

Figure 3:
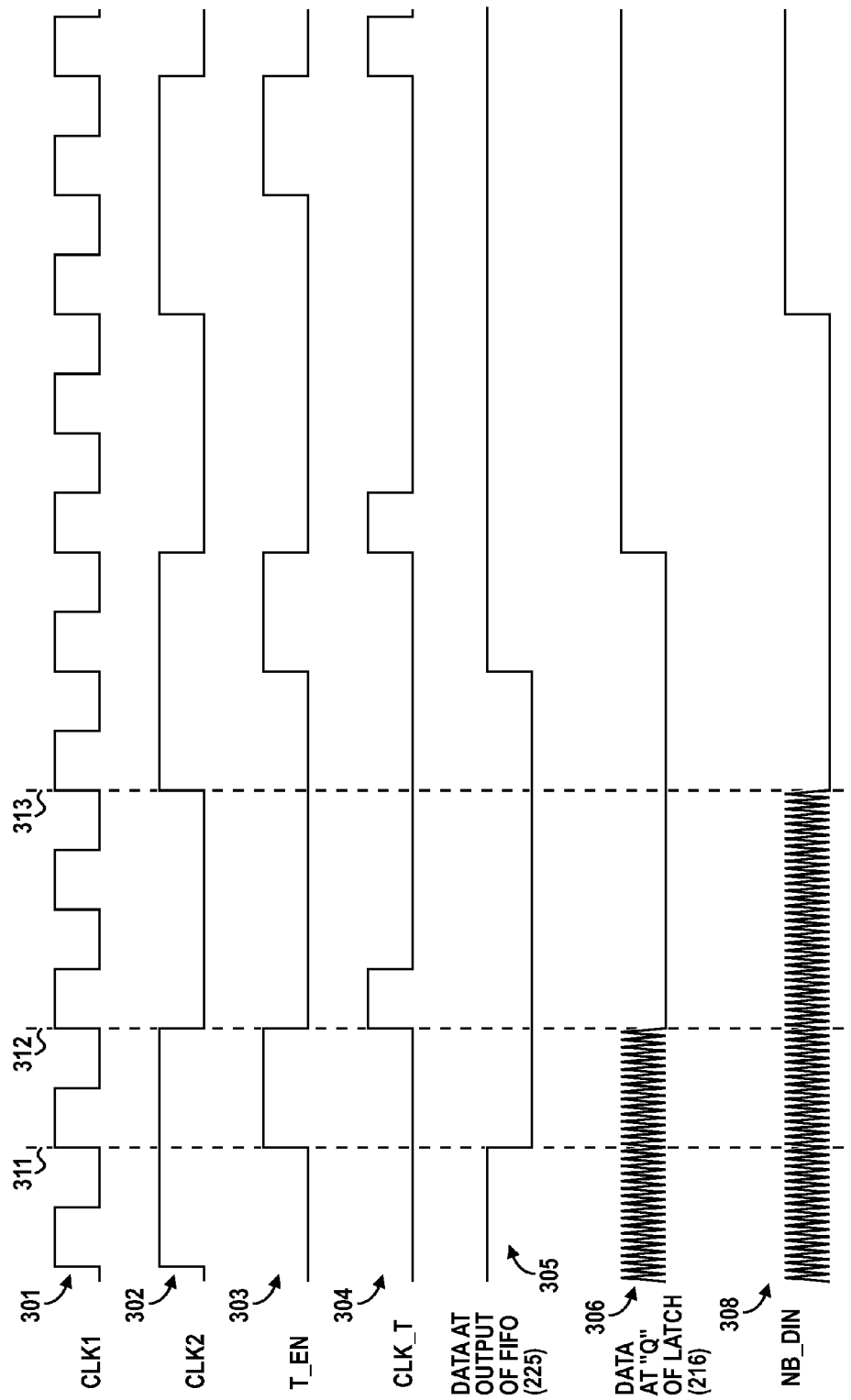
FIG. 3 is a diagram of a particular embodiment of signal waveforms associated with the transfer module of FIG. 2.
Figure 4:
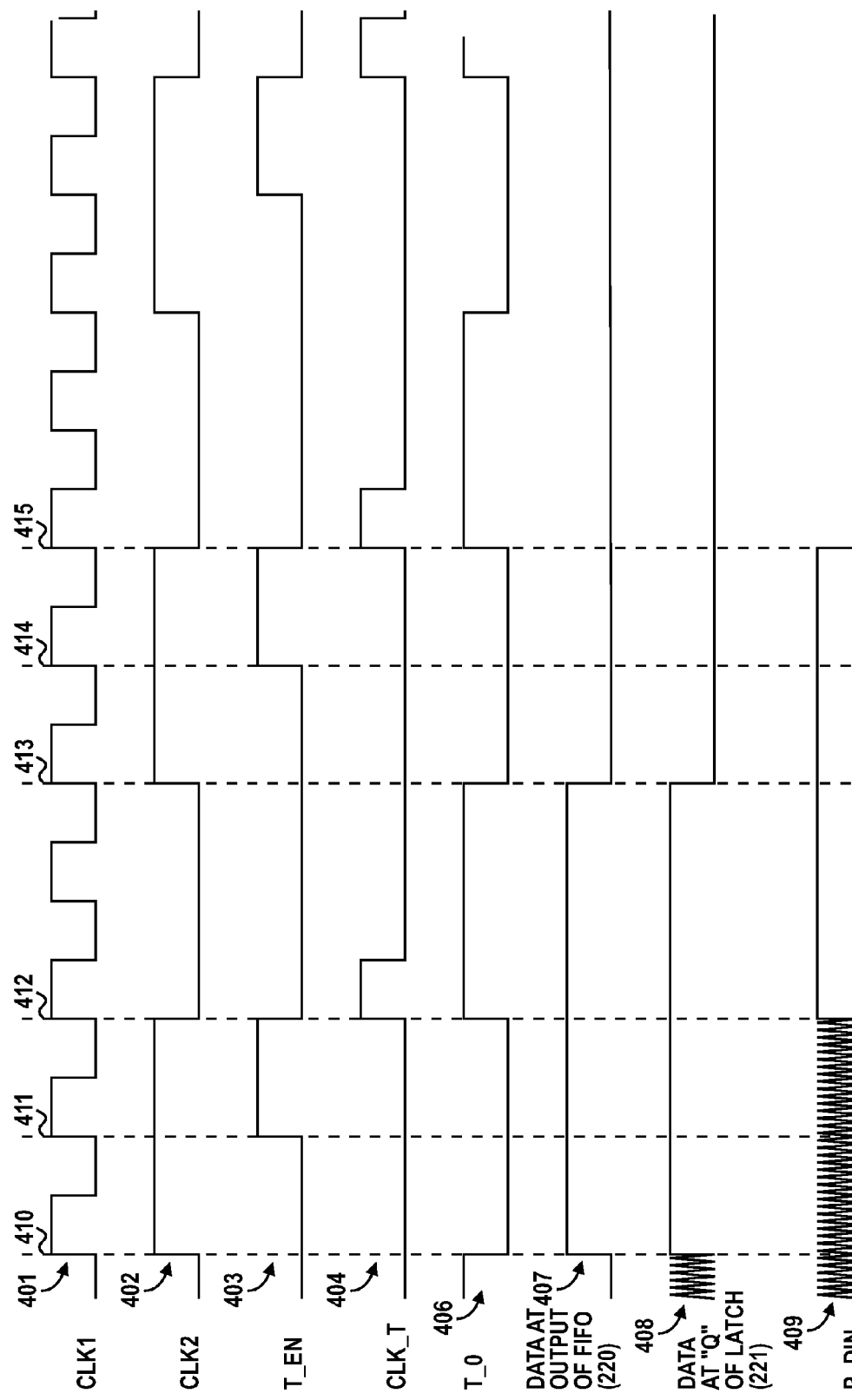
FIG. 4 is a diagram of an alternative particular embodiment of signal waveforms associated with the transfer module of FIG. 2.
Figure 5:
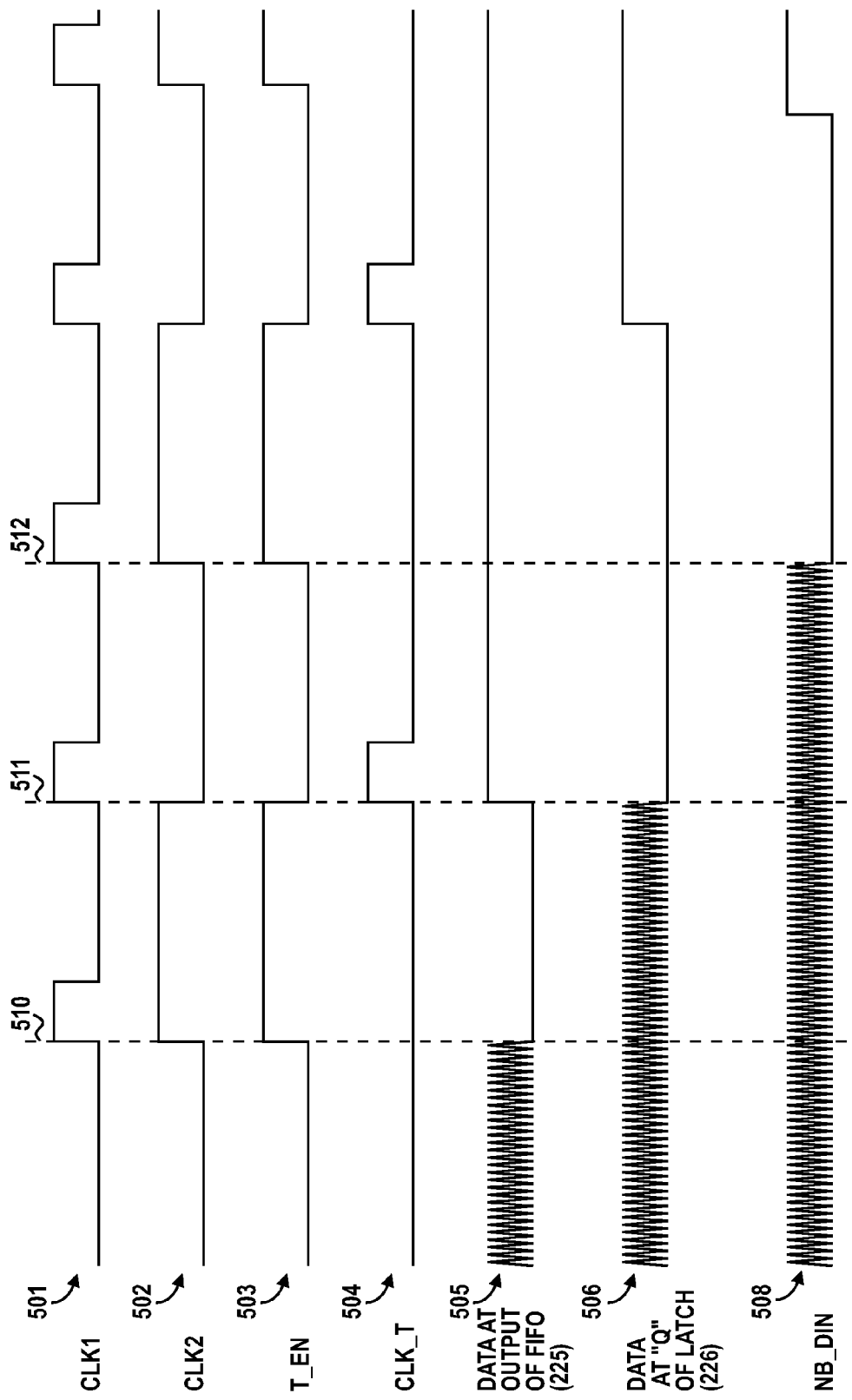
FIG. 5 is a block diagram of a diagram of another particular embodiment of signal waveforms associated with the transfer module of FIG. 2.

The operation of the transfer enable module 210 can be better understood with reference to FIGS. 3-5. FIG. 3 illustrates a diagram of exemplary waveforms for data transfers between data stored at the FIFO 225 and the output signal NB_DIN. In particular, waveforms 301, 302, 303, 304, 307, and 308 illustrate exemplary waveforms for the signals CLK1, CLK2, T_EN, CLK_T, T_O, and NB_DIN, respectively. The waveform 305 represents data provided at the output of the FIFO 225, while the waveform 306 represents data provided at the Q output of the latch 226.

In the illustrated example of FIG. 3, the frequency of the clock signal CLK2 is twice the frequency of the clock signal CLK1. At time 311, in response to a rising edge of the transfer enable signal T_EN, the FIFO 225 provides data at its output represented as a logic low. At time 312, in response to a falling edge of the transfer enable signal T_EN and a rising edge of the clock signal CLK1, the clock gate module asserts the signal CLK_T, which latches the data at the output of the FIFO 225 at the latch 226, as illustrated by waveform 306. At time 313, in response to assertion of the clock signal CLK2, the data at the output of the latch 226 is latched at the latch 227 and provided as the signal NB_DIN, as illustrated by waveform 308. Thus, the data at the output of the FIFO 225, in the clock domain 192, is transferred and provided via the signal NB_DIN in the clock domain 191.

As illustrated, the timing of the transfer enable signal T_EN is controlled so that transfers are initiated at or near the time of a falling edge of the clock signal CLK2. Because the latch 227 is responsive to rising edges of the clock signal CLK2, the timing of the T_EN signal ensures that data changes at the latch 226 occurs remote from any switching at the latch 227, improving reliability of the data transfer.

FIG. 4 illustrates a diagram of a particular embodiment of a diagram of exemplary waveforms for data transfers between data stored at the FIFO 220 and the output signal P_DIN. Waveforms 401, 402, 403, 404, 406, and 409 represent the signals CLK1, CLK2, T_EN, CLK_T, T_O, and P_DIN, respectively. Waveform 407 represents the signal at the output of the FIFO 220, and waveform 408 represents the data stored at the latch 221 and provided via the Q output.

In the illustrated example of FIG. 4, the frequency of the clock signal CLK2 is twice the frequency of the clock signal CLK1. At time 410, data is provided at the output of the FIFO 220 corresponding to a logic high. The data provided is latched at the latch 221. At time 411, the transfer enable signal T_EN is asserted to initiate transfer of data between the clock domains 190 and 191. Accordingly, at time 412, in response to the rising edge of the clock signal CLK1 and the falling edge of the signal T_EN, the clock gate module 263 asserts the signal CLK_T, and the data at the output of the latch 221 is latched at the latch 222 and provided via the signal P_DIN.

Further, at time 412 the transfer monitoring module 252 asserts the signal T_O to indicate a data transfer has occurred. If the data at the FIFO 220 is valid data for transfer, the data validity module asserts the signal DV, thereby causing assertion of the signal at the output of the AND gate 253. This indicates to the FIFO 220 that data can be provided at the output. The FIFO 220 provides this data at time 413. At time 414, the signal T_EN is asserted so that, at time 415, data provided at by the output of the latch 221 is latched at the latch 222 and provided via the signal P_DIN.

Referring to FIG. 5, an alternative embodiment of exemplary waveforms for data transfers between data stored at the FIFO 225 and the output signal NB_DIN is illustrated. In particular, waveforms 501, 502, 503, 504, 507, and 508 illustrate exemplary waveforms for the signals CLK1, CLK2, T_EN, CLK_T, T_O, and NB_DIN, respectively. The waveform 505 represents data provided at the output of the FIFO 225, while the waveform 506 represents data provided at the Q output of the latch 226.

In the illustrated example of FIG. 5, the frequency of the clock signal CLK2 is the same as the frequency of the clock signal CLK1. At time 510, in response to assertion of the clock signal CLK1, data representing a logic low is provided at the output of the FIFO 225, as illustrated by waveform 505. At the same time, the transfer enable signal T_EN is asserted so that data transfer can be initiated. At time 511, in response to the rising edge of the clock signal CLK1 and the falling edge of the signal T_EN, the clock gate module 263 asserts the signal CLK_T. In response, the latch 226 latches the data at the output of the FIFO 225. At time 512, in response to assertion of the clock signal CLK2, the data at the output of the latch 226 is latched at the latch 227, and provided via the signal NB_DIN.

Figure 6:
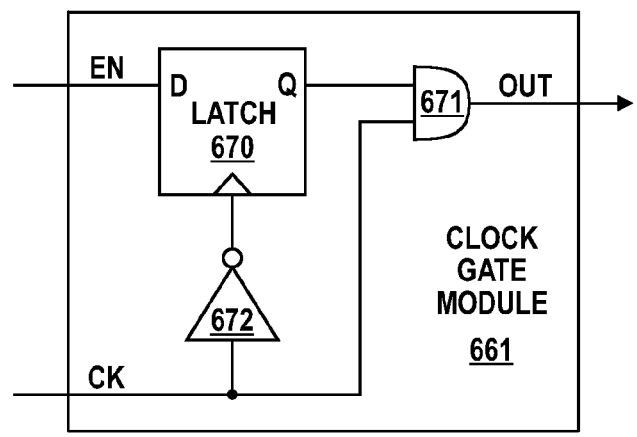
FIG. 6 is a block diagram of a particular embodiment of a clock gate module of FIG. 2.

Referring to FIG. 6, a block diagram of a particular embodiment of a clock gate module 661, corresponding to the clock gate module 261 of FIG. 2 is illustrated. The clock gate module 261 includes a latch 670, an AND gate 671, and an inverter 672. The latch 670 includes an input labeled "D" connected to the EN input of the clock gate module 661, a clock input, and an output labeled "Q." The inverter 672 includes an input connected to the input CK of the clock gate module 661, and an output connected to the clock input of the latch 670. The AND gate 671 includes an input connected to the output of the latch 670, an input connected to the input CK of the clock gate module 661, and an output connected to the OUT output of the clock gate module 661.

During operation, the output of the latch 670 is similar to the signal at the EN input, but delayed in time based on the clock signal received at the CK input and inverted by the inverter 672. The clock signal received at the CK input and the output of the latch 670 are applied to the inputs of the AND gate 671, so that when both are asserted, the signal at the output OUT is also asserted. The result is that the signal at the OUT output is asserted in response to a falling edge of the signal at the EN input and a rising edge of the signal at the CK input, and is negated in response to a falling edge of the signal at the CK input.

Figure 7:
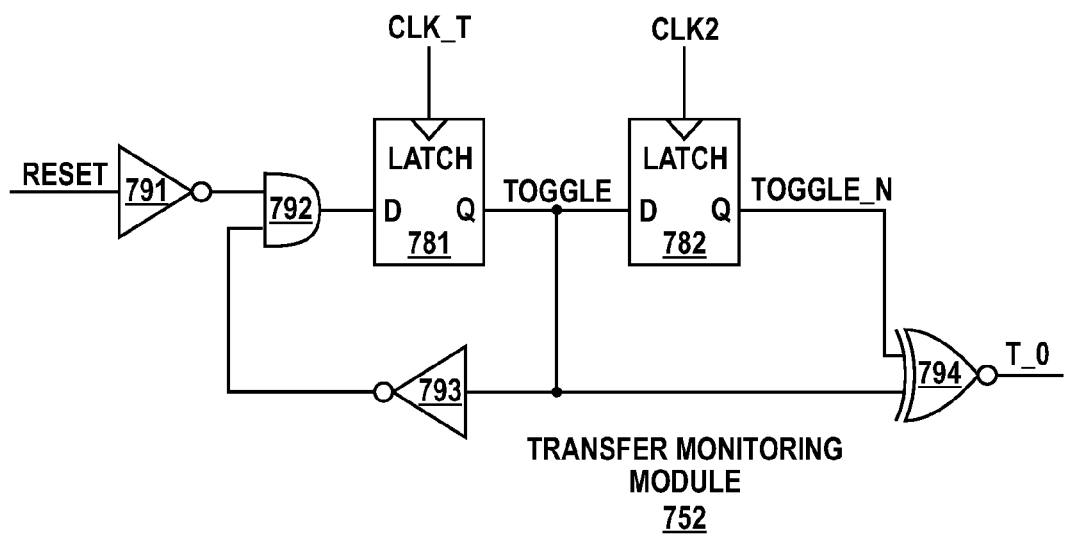
FIG. 7 is a block diagram of a particular embodiment of a transfer monitoring module of FIG. 5.

Referring to FIG. 7, a block diagram of a particular embodiment of a transfer monitoring module 752, corresponding to the transfer monitoring module 252 of FIG. 2, is illustrated. The transfer monitoring module 752 includes latches 781 and 782, inverters 791 and 793, an AND gate 792, and an X-NOR gate 794. The inverter 791 includes an input to receive the RESET signal and an output. The AND gate 792 includes a first input connected to the output of the inverter 791, a second input, and an output. The latch 781 includes an input labeled "D" connected to the output of the AND gate 792, a clock input to receive the signal CLK_T, and an output to provide a signal labeled "TOGGLE." The inverter 793 includes an input to receive the signal TOGGLE and an output connected to the second input of the AND gate 792.

The latch 782 includes an input labeled "D" to receive the signal TOGGLE, a clock input to receive the clock signal CLK2, and an output labeled "TOGGLE_N." The X-NOR gate 794 includes an input to receive the signal TOGGLE, an input to receive the signal TOGGLE_N, and an output to provide the signal T_O.

The configuration of the elements of the transfer monitoring module 752 result in the T_O signal being asserted when the signals TOGGLE and TOGGLE_N will have different states at the subsequent rising edge of the clock signal CLK2. This ensures that the T_O signal is indicative of when data has been transferred from the clock domain 191 to the clock domain 190.

Figure 8:
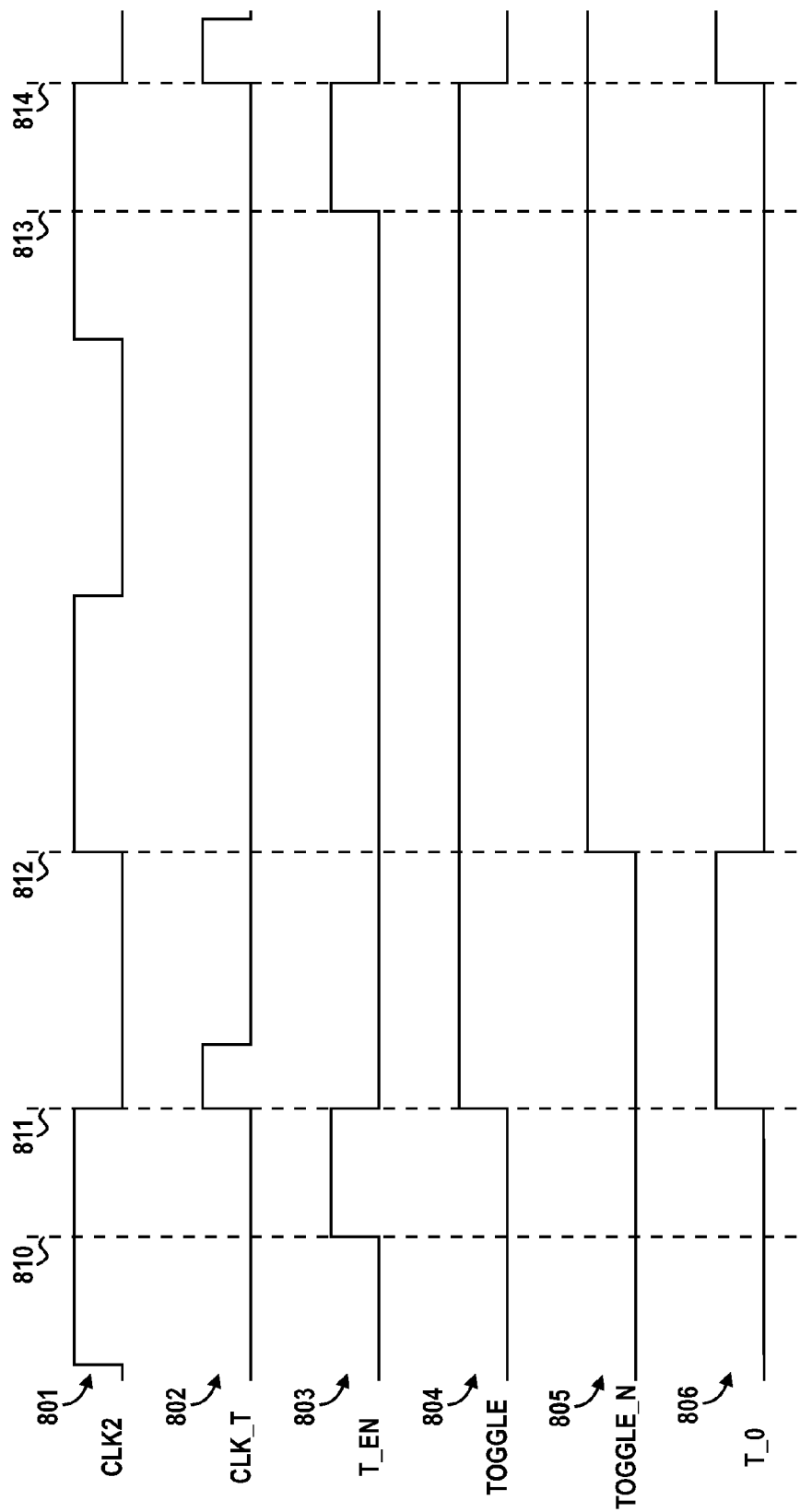
FIG. 8 is a diagram of a particular embodiment of signal waveforms associated with the transfer monitoring module of FIG. 6.

The operation of the transfer monitoring module 752 can be better understood with reference to FIG. 8, which illustrates exemplary waveforms for the signals associated with the module. In particular, FIG. 8 illustrates waveforms 801, 802, 803, 804, 805, and 806, corresponding to the signals CLK2, CLK_T, T_EN, TOGGLE, TOGGLE_N and T_O, respectively. In the illustrated example of FIG. 8, at time 810 the signal T_EN is asserted to enable a transfer of data. In response, at time 811 the signal CLK_T is asserted, which causes a logic high value to be latched at the latch 781 and thereby asserting the signal TOGGLE. This in turn causes assertion of the signal T_O, to indicate a transfer has occurred.

At time 812, a rising edge of the clock signal CLK2 occurs, causing the value of the TOGGLE signal to be latched at the latch 782 and asserting the signal TOGGLE_N. Accordingly, the signal T_O is negated by the X_NOR gate 794. At time 813 the signal T_EN signal is again asserted to enable a data transfer, resulting in assertion of the T_O signal at time 814.

Figure 9:
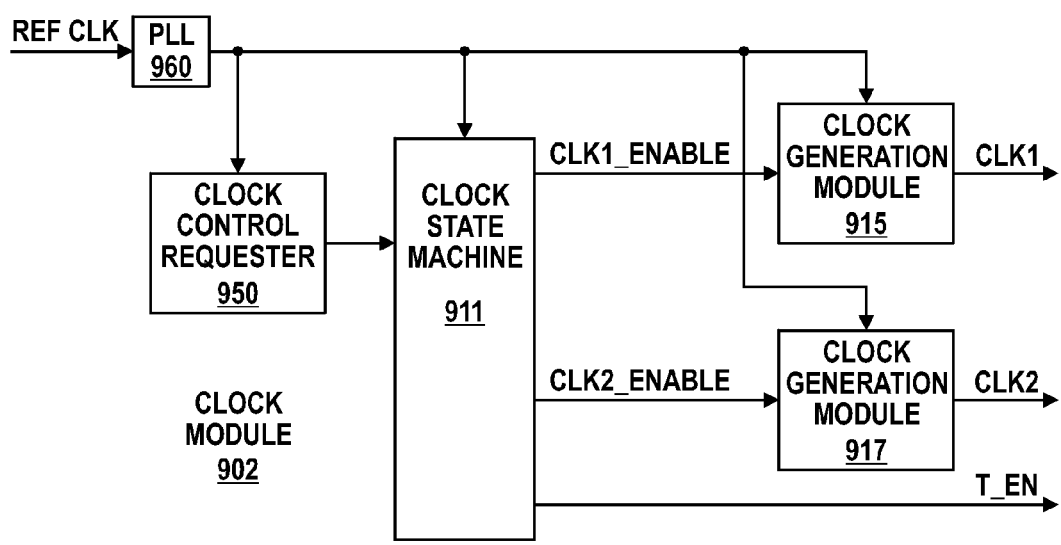
FIG. 9 is a block diagram of a particular embodiment of a clock module of FIG. 1.

FIG. 9 illustrates a block diagram of a particular embodiment of a clock module 902, corresponding to the clock module 102 of FIG. 1. The clock module 902 includes a clock state machine 911, clock generation modules 915 and 917, a clock control register 950, and a phase-locked loop (PLL) 960. The PLL 960 includes an input to receive the signal REFCLK and an output. The clock control register 950 includes an input connected to the output of the PLL 960 and an output. The clock state machine 911 includes an input connected to the output of the PLL 960 and an input connected to the output of the clock control register 950, an output to provide a signal CLK1_ENABLE, an output to provide a signal CLK2_ENABLE, and an output to provide the transfer enable signal T_EN. The clock generation module 915 includes an input to receive the CLK1_ENABLE signal, an input connected to the output of the PLL 960, and an output to provide the clock signal CLK1. The clock generation module 915 includes an input to receive the CLK2_ENABLE signal, an input connected to the output of the PLL 960, and an output to provide the clock signal CLK2.

The clock control register 950 stores information indicating the frequency for each of the clock signals CLK1 and CLK2. The value stored at the clock control register 950 can be adjusted to change each frequency independently. For example, the frequency of one or both of the clock signals CLK1 and CLK2 can be adjusted to conserve power, increase performance, and the like.

Based on the specified frequencies indicated by the clock control register 950, the clock state machine 911 adjusts the timing of assertions of the signals CLK1_ENABLE and CLK2_ENABLE. In addition, based on these frequencies the clock state machine 911 determines when to assert the T_EN signal so that data can be reliably transferred between the clock domains 190 and 191 of FIG. 1.

The PLL 960 provides a stable clock reference to the clock control register 950 and the clock state machine 911, as well as to the clock generation modules 915 and 917, which provide the clock signals CLK1 and CLK2 respectively, based on the clock reference and based on the CLK1_ENABLE and CLK2_ENABLE signals respectively. This provides for a relatively stable relationship between the clock signals CLK1 and CLK2, allowing for reliable data transfer between clock domains.

In an embodiment, the clock state machine 911 synchronizes the CLK1_ENABLE and CLK2_ENABLE signals with the T_EN signal such that, when CLK1 is at less than a maximum frequency, the T_EN signal is negated at a falling edge of CLK2 and a rising edge of CLK1. This causes, at the same time, an assertion of the signal CLK_T, enabling transfer of data between clock domains. In addition, when CLK1 is at a maximum frequency, the clock state machine 911 synchronizes the CLK1_ENABLE and CLK2 enable signals with the T_EN signal such that the T_EN signal is negated at a falling edge of CLK2, which is half a clock cycle earlier than a rising edge of CLK1. This causes a substantially simultaneous assertion of the signal CLK_T, enabling data transfer. By placing the negation of T_EN a half clock cycle earlier than the rising edge of CLK1, this allows transfers to occur for more cycles of CLK2, enhancing transfer efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method, comprising:
   receiving a first clock signal at a first synchronous logic module of a device;
   receiving a second clock signal at a second synchronous logic module of the device;
   asserting an enable signal at a first time based on a first transition of the first clock signal substantially corresponding to a second transition of the second clock signal;
   transferring data from the first synchronous logic module to the second synchronous logic module in response to assertion of the enable signal;
   asserting the enable signal at a second time based on a third transition of the first clock signal substantially corresponding to a fourth transition of the second clock signal; and
   transferring data from the first synchronous logic module to the second synchronous logic module in response to assertion of the enable signal at the second time, a frequency relationship between the first clock signal and the second clock signal at the first time different from a frequency relationship between the first clock signal and the second clock signal at the second time.

2. The method of claim 1, wherein the first transition is of a first type and the second transition is of a second type.

3. The method of claim 2, wherein the first type is a rising transition and the second type is a falling transition.

4. The method of claim 1, further comprising transferring data from the second synchronous logic module to the first synchronous logic module in response to assertion of the enable signal.

5. The method of claim 1, wherein a frequency of the first clock signal at the first time is at least twice a frequency of the second clock signal at the first time, and a frequency of the first clock signal at the second time is at least three times the frequency of the second clock signal at the second time.

6. A device, comprising:
   a clock module comprising a first output to provide a first clock signal, a second output to provide a second clock signal, and a third output to provide a first enable signal, the clock module configured to assert the first enable signal based on a first transition of the first clock signal substantially corresponding to a second transition of the second clock signal;
   a transfer module configured to transfer first data from a first clock domain associated with the first clock signal to a second clock domain associated with the second clock signal in response to assertion of the first enable signal;
   a first FIFO comprising an input to receive data from a first logic module and an output, the first FIFO to provide the first data in response to assertion of the first enable signal;
   a first latch comprising an input coupled to the output of the first FIFO, a clock input configured to receive a second enable signal, and an output, wherein the second enable signal is based on the first enable signal;
   a second latch comprising an input coupled to the output of the first latch and a clock input configured to receive a third enable signal, the third enable signal based on the second clock signal;
   a second FIFO comprising an input to receive data from a second logic module and an output;
   a third latch comprising an input coupled to the output of the second FIFO, a clock input configured to the second clock signal, and an output; and
   a fourth latch comprising an input coupled to the output of the first latch and a clock input configured to receive the second enable signal.

7. The device of claim 6, wherein the transfer module is further configured to transfer second data from the second clock domain to the first clock domain in response to assertion of the first enable signal.

8. The device of claim 6, wherein the transfer module further comprises:
   a first clock gate module comprising a first input configured to receive the first clock signal, a second input to receive the first enable signal and an output configured to provide the second enable signal based on the first clock signal and the first enable signal.

9. The device of claim 8, wherein the first clock gate module further comprises:
   a fifth latch comprising an input configured to receive the first enable signal, a clock input, and an output;
   an inverter comprising an input configured to receive the first clock signal, and an output coupled to the clock input of the fifth latch; and
   an AND gate comprising an input coupled to the output of the fifth latch, an input configured to receive the first clock signal, and an output configured to provide the second enable signal.

10. The device of claim 9, wherein the transfer module further comprises:
    a second clock gate module comprising a first input configured to receive the second clock signal, a second input configured to receive a transfer signal indicative of whether a transfer between the first and second logic modules have occurred, and an output configured to provide the third enable signal based on the second clock signal and the transfer signal.

11. The device of claim 10, wherein the transfer module further comprises a transfer monitoring module comprising an input configured to receive the second enable signal, an input configured to receive the second clock signal, and an output configured to provide the transfer signal based on the second enable signal and the second clock signal.

12. The device of claim 11, wherein the transfer monitoring module further comprises:
    a first inverter comprising an input configured to receive reset signal indicative of a reset state and an output;
    an AND gate comprising a first input coupled to the output of the inverter, a second input, and an output;
    a sixth latch comprising an input coupled to the output of the AND gate, a clock input configured to receive the second enable signal, and an output;
    a second inverter comprising an input coupled to the output of the sixth latch and an output coupled to the second input of the AND gate;
    a seventh latch comprising an input coupled to the output of the second latch, a clock input configured to receive the second clock signal, and an output; and
    an X-NOR gate comprising an input coupled to the output of the sixth latch, an input coupled to the output of the seventh latch, and an output configured to provide the transfer signal.

13. The device of claim 11, wherein the transfer module is configured to transfer the first data from the first clock domain to the second clock domain in response to assertion of the first enable signal at a first time, and is configured to transfer second data from the first clock domain to the second clock domain in response to assertion of the second enable signal at a second time, a frequency relationship between the first clock signal and the second clock signal at the first time different from a frequency relationship between the first clock signal and the second clock signal at the second time.

* * * * *